Patented June 6, 1950

2,510,894

UNITED STATES PATENT OFFICE 2,510,894

PRODUCTION OF ORGANO-THIYL COMPOUNDS

Morton Kleiman, Chicago, Ill., assignor to Velsicol Corporation, Chicago, Ill., a corporation of Illinois No Drawing. Application December 20, 1946, Serial No. 717,596

12 Claims. (Cl. 260—608)

This invention relates to organo-thiyl compounds, such as organic disulfides and mercaptans, and to a process for producing the same. More particularly, my invention relates to new classes of organic disulfides and new compositions of matter, as well as to methods whereby these and related known materials may be prepared.

One object of this invention is to provide a new process for preparing symmetrical and unsymmetrical organic disulfides. A symmetrical disulfide is herein defined as a compound of the general formula RSSR, wherein R represents any organic radical. An unsymmetrical organic disulfide is herein defined as a compound of the general formula RSSR', wherein R and R' represent two different organic radicals.

Another object of this invention is the preparation of organic disulfides hitherto unknown and/or believed to be impossible of existence.

Another object of this invention is to provide a new and simplified process for producing organic disulfides which have heretofore been prepared only with great difficulty by previously known methods.

Another object relates to the production and recovery of mercaptans.

Other objects and advantages will become apparent hereinafter.

Heretofore, only a few unsymmetrical organic disulfides have been synthesized. These have included a number of variously substituted diaryl disulfides and aryl alkyl disulfides. The methods involved in the preparation of these compounds have all been severally limited, painstaking, and costly, and therefore generally unsuited to industrial practice. Furthermore, owing to the extremely limited utility of these methods, it has never before been possible to synthesize most of the vast number of unsymmetrical disulfides theoretically capable of existence. Thus, no successful synthesis of any of the following types of unsymmetrical disulfides has heretofore been recorded:

1. Di-aliphatic and substituted di-aliphatic disulfides, such as, for example, methyl n-amyl disulfide, methyl beta-hydroxyethyl disulfide, or ethyl beta-chloroethyl disulfide.

2. Aliphatic alicyclic and substituted aliphatic alicyclic disulfides, such as, for example, ethyl cyclohexyl disulfide or ethyl 4-chlorocyclohexyl disulfide.

3. Substituted aliphatic aromatic disulfides, such as, for example, beta-hydroxyethyl phenyl disulfide, methyl 4-chlorophenyl disulfide, or isopropyl 3-nitrophenyl disulfide.

4. Aliphatic heterocyclic and substituted aliphatic heterocyclic disulfides, such as, for example, methyl 2-benzothiazyl disulfide, ethyl 2-thienyl disulfide, or methyl 2-pyridyl disulfide.

5. Di-alicyclic and substituted di-alicyclic disulfides, such as, for example, cyclopropyl cyclohexyl disulfides, or 4-bromocyclohexyl disulfide.

6. Alicyclic aromatic and substituted alicyclic aromatic disulfides, such as, for example, cyclohexyl naphthyl disulfide, cyclopentyl phenyl disulfide, or cyclopentyl 2-chlorophenyl disulfide.

7. Alicyclic heterocyclic and substituted alicyclic heterocyclic disulfides, such as, for example, cyclohexyl 4-pyridyl disulfide or cyclopentyl 2-benzothiazyl disulfide.

8. Aromatic heterocyclic and substituted aromatic heterocyclic disulfides, such as, for example, phenyl 2-thienyl disulfide or 4-nitrophenyl 2-pyrryl disulfide.

9. Di-heterocyclic and substituted di-heterocyclic disulfides, such as, for example, 4-pyridyl 2-benzothiazyl disulfide or 4-(2-chloropyridyl) 2-benzothiazyl disulfide.

Compounds belonging to any of the above classes may now be prepared simply, and in good yield by the process embodied in the present invention.

Broadly stated, my invention comprises providing an appropriate reaction mixture in which all the groups desired are present (but obviously not in the same combination as that of the finally desired compound or compounds) and effecting the redistribution of these groups by appropriate means, as described hereinafter.

Thus, in one specific embodiment, my invention relates to a method of synthesizing organic disulfides by effecting a redistribution of organothiyl groups, as described hereinafter, within a reaction mixture of organic disulfides wherein the organo-thiyl groups of the reactants are in combination different from that of the desired reaction product. The reaction mixture may be composed of different symmetrical organic disulfides, different unsymmetrical organic disulfides, or a mixture of symmetrical and unsymmetrical organic disulfides. For example, an unsymmetrical organic disulfide may be synthesized by subjecting to appropriate redistribution conditions a reaction mixture comprising two symmetrical organic disulfides.

In another specific embodiment, my invention relates to a method of synthesizing organic disulfides, either symmetrical or unsymmetrical, by effecting a redistribution of organo-thiyl groups, as described hereinafter, within a reaction mixture of an organic disulfide and a mercaptan wherein the organo-thiyl groups of the reactants are in combination different from that of the desired reaction product. The organic disulfide of the reaction mixture may be unsymmetrical or symmetrical. In the latter case the RS-group of the mercaptan should be different from those present in the symmetrical organic disulfide. In this embodiment mercaptans may be recovered as a product or byproduct of the process.

In still another specific embodiment, my invention relates to the synthesis of symmetrical organic disulfides by effecting, as described hereinafter, a redistribution of the organo-thiyl groups of unsymmetrical organic disulfides.

The following are illustrative of some of the reactions which occur:

1. $RSSR + R'SSR' \rightleftarrows 2RSSR'$

2. $RSSR + R'SH \rightleftarrows RSSR' + RSH$

3. $RSSR + 2R'SH \rightleftarrows R'SSR' + 2RSH$

Thus, in accordance with Equation 1, any particular unsymmetrical disulfide, RSSR', may be obtained by appropriate treatment as described hereinafter, of a mixture of the two symmetrical disulfides, RSSR, and R'SSR'. Conversely, unsymmetrical disulfides may be similarly converted and by subsequent suitable fractionation or other ordinary purification procedure separated into each of the symmetrical disulfides corresponding to the various RS-groups originally present.

In accordance with Equation 2, any particular unsymmetrical disulfide, RSSR', may be obtained by analogous treatment of an approximately equimolar mixture of a symmetrical disulfide, RSSR, and a mercaptan, R'SH.

In accordance with Equation 3, a symmetrical disulfide, R'SSR', may be obtained by reacting two or more mols of its corresponding thiol compound, R'SH, with approximately one mol of a different, symmetrical disulfide, RSSR. It is obvious that this same reaction may be utilized as well for producing mercaptans. A special case of this reaction is the catalyzed reduction of a disulfide by hydrogen sulfide; this reagent may be regarded as a mercaptan, reacting in accordance with the same general scheme, as follows:

4. 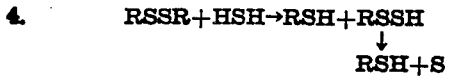

The end result being:

5. 

For carrying out the redistribution reactions described above in accordance with the present invention, certain catalytic agents are employed, which comprise the halogens, chlorine, bromine, and iodine, and the halogen acids, hydrogen chloride, hydrogen bromide, and hydrogen iodide.

These catalyzed reactions are generally performed in non-aqueous, liquid systems at temperatures from about 20° C. to about 225° C. for a period of from about one to twenty-four hours. These limits of temperature and time are not critical, but represent rather, the optimum working range. Thus, at temperatures much below 20° C., these reactions become very slow and require an unduly extended reaction period, while at temperatures much above 225° C., the advantages of greater reaction velocities are offset by the disadvantages of causing some decomposition of the reactants. In some instances, it may also be necessary when using higher temperatures, to provide sufficient pressure to confine the reactants to the reaction vessel and to retain them in the liquid state.

Occasionally it is more convenient or advantageous to operate in an aqueous system. This is the case, for example, when dealing with a reaction mixture containing a water-soluble reactant and a water-insoluble reactant. By performing the reaction in the presence of water, it often becomes possible to facilitate the removal of the excess or unreacted portion of the soluble components without recourse to fractional distillation, simply by separation of the aqueous phase. The possibility of these or other advantages of operating in an aqueous system may be readily determined by simple experiments.

In most instances, the mixture of reactants is simply heated for about one hour (or even less, such as about one-half hour, but with lower yields) at a temperature between 80° C. and 100° C. with a minute quantity of catalyst. The separation of the reaction product is then effected by usual methods, such as fractional distillation, crystallization, etc. Often it is not necessary to remove the catalyst prior to the separation of the product by distillation or crystallization. In general, however, it is desirable that the catalyst be removed so that a new and unfavorable equilibrium is not established. Conversely, in the conversion of an unsymmetrical disulfide to its symmetrical parent compounds and the separation of the latter by fractional distillation, the presence of catalyst may be desirable throughout the operation.

There are many important uses in industry and the arts for organic disulfides and mercaptans prepared in accordance with my invention, including both those previously known but which may now be prepared more simply and cheaply by the processes of my invention, and those which have not previously been known and which may now be prepared for the first time by the methods herein disclosed. Especially prominent among the many industrial applications of these known compounds is their utilization as modifiers, stabilizers, accelerators, anti-oxidants and vulcanizing agents in the manufacture of synthetic and natural rubber products. Among the large number of such compounds which are useful for these applications, the following may be mentioned as typical: alpha- and beta-naphthyl mercaptans, o- and p - mercaptobiphenyls, diisopropyl dixanthogen, tolyl disulfide, alkyl phenol disulfides, 2-methylbutyl disulfide, 3-methylpentyl disulfide, 2-ethylhexyl disulfide, 2-mercaptobenzothiazole, 2-mercaptobenzoxazole, 2-mercapto-4-alkyl or aryl-thiazole, thioglycolic acid, thiolactic acid, beta-mercaptoethanol, dithiodiglycolic acid, bis-(beta-hydroxyethyl) disulfide, and bis-(beta-aminoethyl) disulfide.

Organic disulfides such as butyl disulfide, whose preparation from butyl mercaptan is described in Example 1, are excellent solvents for rubber, resins, and plastics, and their use enables the utilization of a wide variety of special formulations of coating compositions which exploit the unique plasticizing properties of these materials—especially of rubber.

Many mercaptans and disulfides, previously known, but which may now be prepared more simply and economically by the processes of my invention, are chemical intermediates for the synthesis of sulfonic acids and sulfonium compounds which find extensive applications as wetting agents, detergents, emulsifiers and demulsifiers. Certain mercaptans, such as ethyl mercaptan, butyl mercaptan, and amyl mercaptan, and disulfides, such as furfuryl disulfide, are of considerable importance as odorants, the former as warning agents in gases and the latter as ingredients in perfumes. In the manufacture of particular types of glues and adhesives, certain vegetable proteins and albumenoids, such as soybean flour, linseed protein, etc., are treated with organic disulfides, such as methyl disulfide and butyl disulfide. Allyl disulfide and 2-methylallyl disulfide are valuable additives for imparting greater stability to films against the action of heat and ultra-violet light. The xanthates and dixanthogens are well known and have long been used as flotation agents. Other disulfides, such as dihexamethylenethiuram disulfide, dimorpholinethiuram disulfide, diphenyl disulfide, bis-(4-chlorophenyl) disulfide and beta-naphthyl disulfide, are of use as fungicides and insecticides. A number of disulfides, such as methyl disulfide and ethyl disulfide, are also used as additives in lubricating oils for improving the film strength and tenacity under high pressure, and as stabilizing agents in viscous, highly refined mineral oils, such as transformer oils.

In the category of organic disulfides which have hitherto been unknown and impossible to prepare by known methods but which may now be made according to the principles herein disclosed, are many compounds which I have found to possess properties valuable in industry and the arts. These compounds are useful in many of the applications enumerated above; in addition, particular compounds possess uniquely valuable characteristics.

Thus, for example, the new compound, methyl N,N-diamethylaminothioformyl disulfide, described in Example 7 is a potent insecticide with very good "knock-down" properties. When this compound was tested on flies by the Peet-Grady large chamber method, a 2 per cent W/V solution in refined kerosene gave a "knock-down" of 90 per cent in less than ten minutes and killed 84 per cent of the flies in twenty-four hours. The new, unsymmetrical compound, methyl n-butyl disulfide, described in Example 2, combines the advantages of both the methylthiyl and butylthiyl groups in one molecule, and will thus be found of greater value than either of the parent compounds in the manufacture of glue and adhesives. Methyl octyl disulfide, described in Example 3, will be found useful as an odorant, fixative, and co-solvent in purfumes. It is also an excellent solvent for rubber, resins and plastics, and therefore of value in special coating composition formulations. Methyl beta-hydroxyethyl disulfide and ethyl 2-benzothiazyl disulfide, described in Examples 4 and 5, respectively, will be found useful as rubber chemicals of the type previously described.

From the foregoing discussion and examples it is evident that my invention provides not only simple and inexpensive processes for preparing a large number of known mercaptans and disulfides but also makes possible the synthesis of hitherto unknown disulfides, the composition of which can be "tailored" to provide unique and specially desired characteristics.

Typical practice of this invention, its simplicity, and wide utility will be illustrated by the following specific examples, which are not intended to limit the invention in any respect.

*Example 1*

Reaction of a symmetrical organic disulfide with an excess of a mercaptan, in the presence of dry hydrogen bromide as catalyst, to form a different disulfide and mercaptan:

Methyl disulfide and n-butyl mercaptan were reacted to give n-butyl disulfide and methyl mercaptan as follows: Methyl disulfide (4.7 ml., 0.05 mol) and n-butyl mercaptan (21.0 ml., 0.2 mol) were placed in a flask equipped with a gas inlet tube and a water-cooled, reflux condenser with an outlet tube leading to a cold trap kept at −50° C. Dry hydrogen bromide was bubbled through in a slow, continuous stream, and the mixture was heated at gentle reflux for one hour. Methyl mercaptan (4.5 g.), identified by conversion to methyl 2,4-dinitrophenyl sulfide, was recovered from the colt trap. The other reaction product, n-butyl disulfide (8.4 g.), was obtained by washing the residue remaining behind with water, drying the organic layer over anhydrous potassium carbonate, and fractionating the resulting liquid at reduced pressure.

*Example 2*

Reaction of two symmetrical organic disulfides, in the presence of dry hydrogen chloride as catalyst, to produce a new, unsymmetrical disulfide:

Methyl disulfide and n-butyl disulfide were reacted to form methyl n-butyl disulfide as follows: Methyl disulfide (10.0 ml.) and n-butyl disulfide (10.0 ml.) were placed in a reaction flask equipped with a gas inlet tube and a reflux condenser. Dry hydrogen chloride was bubbled through the mixture at room temperature for two minutes only, and then the mixture was heated at 80–90° C. for one hour. Reduced pressure fractionation of the resulting reaction products yielded methyl n-butyl disulfide (9.3 g.), as well as some recovered starting materials.

*Example 3*

Reaction of two symmetrical organic disulfides, in the presence of iodine as catalyst, to produce a new, unsymmetrical disulfide:

n-Octyl disulfide and methyl disulfide were reacted to give methyl n-octyl disulfide as follows: Methyl disulfide (13.5 ml., 0.15 mol), n-octyl disulfide (16.1 ml., 0.05 mol), and iodine (ca. 50 mg.) were placed in a 50 ml. flask connected by a ground glass joint to a reflux condenser. The mixture was refluxed gently for two hours over a small flame and then permitted to cool. Ether (ca. 10 ml.) was added, and the dark solution was washed free of iodine by shaking with several portions of very dilute, aqueous, sodium thiosulfate, and with water. The organic phase was then dried over anhydrous potassium carbonate, filtered, and distilled. After removal of the ether and the excess methyl disulfide in the forerun, clear, water-white methyl n-octyl disulfide (11.3 gm. B.$_{0.3}$ 65°–68° C.) was obtained.

Example 4

Reaction of two symmetrical organic disulfides, in the presence of bromine as catalyst, to produce a new, unsymmetrical disulfide:

Methyl disulfide and bis-(beta-hydroxyethyl) disulfide were reacted to give methyl beta-hydroxyethyl disulfide as follows: Methyl disulfide (28.2 g., 0.3 mol), bis-(beta-hydroxyethyl) disulfide (23.1 g., 0.15 mol), and a solution of four drops of bromine in ca. 0.5 ml. of carbon tetrachloride were placed in a reaction flask equipped with a reflux condenser. The reactants were thoroughly mixed, and heated at 100° C. for two hours. At the end of this time, the mixture was cooled and washed with very dilute, slightly alkaline, aqueous $Na_2S_2O_3$ and then with water. This treatment removed any catalyst residue as well as the unreacted bis-(beta-hydroxyethyl) disulfide. After drying and filtering the organic layer, the latter was concentrated at reduced pressure, recovering the excess methyl disulfide. The residue was distilled in vacuo, giving methyl beta-hydroxyethyl disulfide, B. P. 112.5–113.5° C./20 mm.

Example 5

Reaction of two symmetrical organic disulfides, in the presence of iodine as catalyst, to produce a new unsymmetrical disulfide:

Ethyl disulfide and benzothiazyl disulfide were reacted to give ethyl benzothiazyl disulfide as follows: Ethyl disulfide (73.2 gm., 0.6 mol), benzothiazyl disulfide (13.3 gm., 0.04 mol), and iodine (ca. 20 mg.) were heated at 100° C. for four hours. The solution, after cooling, was washed with very dilute, alkaline, aqueous sodium thiosulfate, and dried over anhydrous potassium carbonate. The excess ethyl disulfide was distilled off at 20 mm. pressure. The crude product was then distilled, $B._{.005}$ 115–117° C., giving almost pure ethyl benzothiazyl disulfide. It was obtained in analytical purity (yield, 13.6 gm.) by redistillation.

Example 6

Reaction of two symmetrical organic disulfides, in the presence of chlorine as catalyst, to produce a new unsymmetrical disulfide:

Methyl disulfide and diisopropyl dixanthogen were reacted to give methyl isopropoxythioformyl disulfide as follows: A mixture of methyl disulfide (141 g., 1.5 mols) and diisopropyl dixanthogen (40.5 g., 0.15 mol) was placed in a flask equipped with a gas inlet tube and a reflux condenser. A slow stream of chlorine gas was bubbled through the mixture at room temperature for two minutes. The mixture was now heated on a steam bath for two hours, then cooled. The excess methyl disulfide was removed by distillation under reduced pressure ($B._{90}$ 50° C.), and the crude product distilled, $B._{0.2-0.3}$ 50°–52° C., giving almost analytically pure methyl isopropoxythioformyl disulfide.

Example 7

Reaction of two symmetrical organic disulfides, in the presence of iodine as catalyst, to produce a new, unsymmetrical disulfide:

Methyl disulfide and tetramethylthiuram disulfide were reacted to give methyl N,N-dimethylaminothioformyl disulfide as follows: Tetramethylthiuram disulfide (15.0 g., 0.063 mol) was dissolved in an excess of methyl disulfide (60.0 g., 0.63 mol) to which had been added a crystal of iodine (ca. 30 mg.) The solution was heated on a steam bath for one hour, and then cooled, and washed with a very dilute, slightly alkaline, aqueous solution of $Na_2S_2O_3$, and with water. The organic layer was separated, dried over anhydrous potassium carbonate, and filtered. The excess methyl disulfide was removed by distillation at reduced pressure, and the residue was distilled in vacuo, $B._{0.7}$ 104–108° C., giving pure methyl N, N-dimethylaminothioformyl disulfide.

Example 8

Reduction of a symmetrical organic disulfide by a mercaptan (special case: hydrogen sulfide) in the presence of iodine as catalyst:

Methyl disulfide was reduced by hydrogen sulfide in the presence of iodine as catalyst as follows: Methyl disulfide (10 ml.) and iodine (ca. 50 mg.) were placed in a two-neck, 50 ml. flask with a gas inlet tube in one neck and a reflux condenser in the other neck. The top of the reflux condenser was connected to a trap cooled at −80° C. The solution was refluxed gently over a small flame and a rapid stream of hydrogen sulfide was passed through it for a period of one hour. At the end of this time, the cold trap was disconnected, removed from the $CO_2$-acetone bath, and warmed very slowly to 0° C. This permitted the hydrogen sulfide (B. P. −61° C.) which had condensed to boil away, leaving behind the methyl mercaptan (B. P. 6° C.) formed in the reaction.

In order to confirm the identity of this material, it was distilled into alcoholic sodium hydroxide and converted into methyl 2,4-dinitrophenyl sulfide by treatment with 2,4-dinitrochlorobenzene. This derivative was also oxidized to the sulfone; both derivatives established the identity of the product as methyl mercaptan.

Example 9

Reaction of an unsymmetrical organic disulfide in the presence of concentrated aqueous hydrogen iodide (hydriodic acid) as catalyst to produce two symmetrical disulfides:

Methyl disulfide and n-butyl disulfide were obtained from methyl n-butyl disulfide as follows: To methyl n-butyl disulfide (30.0 g.) was added ca. 0.5 ml. of concentrated, iodine-free hydriodic acid, and the mixture was agitated vigorously for one hour while heating on a steam bath. The mixture was now cooled, washed with very dilute, aqueous alkali and with water, and dried over anhydrous potassium carbonate. The liquid was now filtered and fractionally distilled at reduced pressure (20 mm.), giving methyl disulfide, methyl n-butyl disulfide, and n-butyl disulfide in a molar ratio of approximately 1:2:1.

Example 10

Reaction of two symmetrical organic disulfides, in the presence of bromine as catalyst, to produce a new, unsymmetrical disulfide:

Phenyl disulfide and ethyl disulfide were reacted to give ethyl phenyl disulfide as follows: Phenyl disulfide (10.9 g., 0.05 mol), ethyl disulfide (12.2 ml., 0.1 mol), and a solution of 4 drops of bromine in ca. 1 ml. of carbon tetrachloride were heated together under gentle reflux for 2 hours. The catalyst and excess ethyl disulfide were removed in the manner already described, and the crude product was fractionally distilled in vacuo, giving pure ethyl phenyl disulfide, $B._{10}$ 114.5–115° C.

Other examples of various reactants, catalysts, processes, and reaction products, are as follows:

Example 11

Ethyl n-butyl disulfide, an unsymmetrical, di-aliphatic disulfide, may be prepared from n-butyl mercaptan and ethyl disulfide in a 1:1 molar ratio, by reacting these materials under conditions similar to those already described, in the presence of a small amount of bromine as catalyst. Ethyl mercaptan is recovered as a by-product of this reaction.

Example 12

Ethyl 2-chloroethyl disulfide, an unsymmetrical, substituted, di-aliphatic disulfide, may be prepared from a mixture of the two symmetrical disulfides, ethyl disulfides, and bis-(2-chloroethyl) disulfide, under the conditions already outlined, in the presence of a small amount of chlorine as catalyst.

Example 13

Ethyl allyl disulfide, an unsymmetrical, di-aliphatic disulfide may be prepared similarly by reacting ethyl disulfide and allyl mercaptan in a 1:1 molar ratio, in the presence of a small quantity of iodine as catalyst. Ethyl mercaptan is recovered as a by-product of this reaction.

Example 14

Isopropyl cyclopentyl disulfide, an unsymmetrical, aliphatic alicyclic disulfide, may be prepared from a mixture of the two symmetrical compounds, isopropyl disulfide and cyclopentyl disulfide, under the conditions outlined above, in the presence of a small amount of hydrogen chloride as catalyst.

Example 15

Ethyl cyclohexyl disulfide, an unsymmetrical, aliphatic alicyclic disulfide, may be prepared from ethyl disulfide and cyclohexyl mercaptan in a 1:1 molar ratio, in the manner already described, by the use of a small quantity of hydrogen bromide as the catalyst. Ethyl mercaptan is recovered as a by-product of this reaction.

Example 16

Allyl 4-chlorocyclohexyl disulfide, an unsymmetrical, substituted, aliphatic alicyclic disulfide, may be prepared from a mixture of the two symmetrical compounds, allyl disulfide and 4-chlorocyclohexyl disulfide, in the presence of a small amount of hydrogen iodide or 48 percent hydriodic acid as catalyst.

Example 17

2-hydroxyethyl phenyl disulfide, a substituted, unsymmetrical, aliphatic aromatic disulfide, may be prepared from a mixture of the two symmetrical disulfides, bis-(2-hydroxyethyl) disulfide, and phenyl disulfide, in the manner already described, by using a small amount of chlorine as catalyst.

Example 18

2-chloropropyl alpha-naphthyl disulfide, a substituted, unsymmetrical, aliphatic aromatic disulfide, may be prepared from a mixture of the two symmetrical disulfides, bis-(2-chloropropyl) disulfide and bis-(alpha-naphthyl) disulfide, under the usual reaction conditions, by the use of a small amount of hydrogen chloride as catalyst.

Example 19

Methyl 4-chlorophenyl disulfide, an unsymmetrical, substituted, aliphatic aromatic disulfide, may be prepared from a mixture of methyl disulfide and 4-chlorothiophenol in a 1:1 molar ratio, in the manner already described in detail above, by the use of a small quantity of hydrogen bromide as catalyst. Methyl mercaptan is recovered as a by-product of this reaction.

Example 20

Ethyl 2-thienyl disulfide, an unsymmetrical, aliphatic heterocyclic disulfide, may be prepared from ethyl disulfide and 2-mercaptothiophene in a 1:1 molar ratio, under the conditions of reaction usually employed, by the use of a small quantity of hydrogen bromide as catalyst. Ethyl mercaptan is recovered as a by-product of this reaction.

Example 21

Methyl 2-pyridyl disulfide, an unsymmetrical, aliphatic heterocyclic disulfide, may be prepared from methyl disulfide and 2-mercaptopyridine by reacting these two materials in a 1:1 molar ratio, in the presence of a small amount of bromine as catalyst. Methyl mercaptan is recovered as a by-product of this reaction.

Example 22

Allyl 4-(2-chloropyridyl) disulfide, an unsymmetrical, substituted, aliphatic heterocyclic disulfide, may be prepared in the usual manner from a mixture of the two symmetrical disulfides, allyl disulfide, and bis-[4-(2-chloropyridyl)] disulfide, in the presence of iodine as catalyst.

Example 23

Cyclopentyl cyclohexyl disulfide, an unsymmetrical, di-alicyclic disulfide, may be prepared in the manner already described from a mixture of the two symmetrical compounds, cyclopentyl disulfide and cyclohexyl disulfide, by reacting these in the presence of a catalyst comprising a small amount of hydrogen bromide.

Example 24

3-chlorocyclohexyl cyclohexyl disulfide, a substituted, unsymmetrical di-alicyclic disulfide, may be prepared from a mixture of the two symmetrical compounds bis-(3-chlorocyclohexyl) disulfide and cyclohexyl disulfide by interacting the two in the usual manner in the presence of hydrogen chloride as catalyst.

Example 25

Cyclopentyl cyclohexyl disulfide, an unsymmetrical, di-alicyclic disulfide may be prepared from cyclopentyl disulfide and cyclohexyl mercaptan in a 1:1 molar ratio by interacting the two in the presence of a small amount of chlorine as catalyst. Cyclopentyl mercaptan is recovered as a by-product in this reaction.

Example 26

Cyclohexyl phenyl disulfide, an unsymmetrical, alicyclic aromatic disulfide, may be prepared in the usual manner from a mixture of the two symmetrical compounds, cyclohexyl disulfide and phenyl disulfide, by interacting these in the presence of a small quantity of iodine as a catalyst.

Example 27

Cyclohexyl beta-naphthyl disulfide, an unsymmetrical, alicyclic aromatic disulfide, may be prepared by interacting the two symmetrical compounds, cyclohexyl disulfide and beta-naphthyl disulfide, in the presence of a catalyst comprising hydrogen chloride.

Example 28

Cyclopentyl 2-chlorophenyl disulfide, an unsymmetrical, substituted, alicyclic aromatic disulfide, may be prepared by interacting cyclopentyl disulfide and 2-chlorothiophenol in a 1:1 molar ratio in the presence of a small quantity of hydrogen bromide as catalyst. Cyclopentyl mercaptan is recovered as a by-product of this reaction.

Example 29

Cyclohexyl 4-pyridyl disulfide, an unsymmetrical, alicyclic heterocyclic disulfide, may be prepared in the usual manner from a mixture of the two symmetrical disulfides, cyclohexyl disulfide and bis-(4-pyridyl) disulfide by interacting these materials in the presence of a small amount of iodine as catalyst.

Example 30

Cyclopentyl 2-benzothiazyl disulfide, an unsymmetrical, alicyclic heterocyclic disulfide, may be prepared from an equimolar mixture of cyclopentyl disulfide and 2-mercaptobenzothiazol in the presence of hydrogen bromide as catalyst. Cyclopentyl mercaptan may be recovered as a by-product of this reaction.

Example 31

4-chlorocyclohexyl 2-thienyl disulfide, a substituted, unsymmetrical, alicyclic heterocyclic disulfide, may be prepared from a mixture of the two symmetrical compounds, bis-(4-chlorocyclohexyl) disulfide and bis-(2-thienyl) disulfide by interacting these materials in the presence of hydrogen chloride as catalyst.

Example 32

Phenyl 2-thienyl disulfide, an unsymmetrical, aromatic heterocyclic disulfide, may be prepared by interacting in a 1:1 molar ratio, bis-(2-thienyl) disulfide and thiophenol in the presence of bromine as catalyst. 2-mercaptothiophene is recovered as a by-product of this reaction.

Example 33

Phenyl 4-pyridyl disulfide, an unsymmetrical, aromatic heterocyclic disulfide, may be prepared from a mixture of the two symmetrical compounds, phenyl disulfide and bis-(4-pyridyl) disulfide, by interacting these two materials under the usual reaction conditions in the presence of iodine as catalyst.

Example 34

4-nitrophenyl 2-thienyl disulfide, a substituted, unsymmetrical, aromatic heterocyclic disulfide, may be prepared by interacting the two symmetrical compounds, bis-(4-nitrophenyl) disulfide and bis-(2-thienyl) disulfide, under the usual reaction conditions in the presenec of hydrogen chloride as catalyst.

Example 35

2-thienyl 4-pyridyl disulfide, an unsymmetrical, diheterocyclic disulfide, may be prepared from a 1:1 molar mixture of bis-(2-thienyl) disulfide and 4-mercaptopyridine by interacting these two materials in the presence of iodine as catalyst. 2-mercaptothiophene is recovered as a by-product of this reaction.

Example 36

4-pyridyl 4-(2-chloropyridyl) disulfide, a substituted, unsymmetrical, di-heterocyclic disulfide, may be prepared by reacting under the usual conditions, a mixture of the two symmetrical compounds, bis-(4-pyridyl) disulfide and bis-[4-(2-chloropyridyl)] disulfide, in the presence of a small amount of chlorine as catalyst.

Example 37

2-thienyl 2-benzothiazyl disulfide, an unsymmetrical, di-heterocyclic disulfide, may likewise be prepared from a mixture of the two symmetrical materials, bis-(2-thienyl) disulfide and bis-(2-benzothiazyl) disulfide by interacting these two materials under the usual reaction conditions, in the presence of a catalyst comprising hydrogen iodide.

Other examples of the preparation of symmetrical disulfides by interaction of two mols of a mercaptan with one mol of a symmetrical disulfide are as follows:

Example 38

Phenyl disulfide, a symmetrical, aromatic disulfide, may be prepared by reacting under the usual conditions a mixture of two or more mols of thiophenol and one mol of isopropyl disulfide in the presence of hydrogen bromide as catalyst. Isopropyl mercaptan is recovered as a by-product of this reaction.

Example 39

Beta-naphthyl disulfide, a symmetrical, aromatic disulfide, is prepared from beta-mercaptonaphthalene when two or more mols of this compound are interacted with one mol of ethyl disulfide in the presence of a catalytic quantity of bromine. Ethyl mercaptan is recovered as a by-product in this reaction.

Example 40

Bis-(4-pyridyl) disulfide, a symmetrical, di-heterocyclic disulfide, may likewise be prepared by interacting two or more mols of 4-mercaptopyridine with one mol of methyl disulfide in the presence of a catalytic quantity of iodine. Methyl mercaptan is recovered as a by-product in this reaction.

Other examples of the formation of symmetrical disulfides by reaction of an unsymmetrical organic disulfide with any of the above catalytic materials are as follows:

Example 41

The unsymmetrical, substituted, aliphatic aromatic disulfide, 2-hydroxyethyl phenyl disulfide, gives the symmetrical compounds bis-(2-hydroxyethyl) disulfide, and phenyl disulfide, when it is treated with a small amount of chlorine as catalyst, under the reaction conditions already described.

Example 42

The unsymmetrical, di-aliphatic disulfide, ethyl allyl disulfide, gives the two symmetrical compounds, ethyl disulfide and allyl disulfide, by treating it with a catalyst comprising iodine under the usual reaction conditions.

Example 43

The unsymmetrical, aliphatic alicyclic disulfide, isopropyl cyclopentyl disulfide, likewise gives the two symmetrical compounds, isopropyl disulfide and cyclopentyl disulfide, by treating it with a catalyst comprising hydrogen bromide, under the usual conditions of reaction.

Any of the numerous, unsymmetrical disulfides mentioned above will react in a similar manner under similar reaction conditions to furnish an equilibrium mixture of the two symmetrical disulfides which correspond to the organo-thiyl groups of the unsymmetrical disulfide.

The above description and examples are for illustration only and are not intended to limit the scope of the invention. Any departure therefrom which conforms to the spirit of the invention and comes within the scope of the appended claims is to be regarded as an embodiment of this invention.

I claim as my invention:

1. The method of synthesizing organic disulfides which comprises subjecting reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by reacting said reactants in the presence of a catalyst chosen from the group consisting of, chlorine, bromine, iodine, hydrogen chloride, hydrogen bromide, and hydrogen iodide.

2. The method of synthesizing organic disulfides which comprises subjecting reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by reacting said reactants in the presence of iodine as a catalyst.

3. The method of synthesizing organic disulfides which comprises subjecting reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by reacting said reactants in the presence of bromine as a catalyst.

4. The method of synthesizing organic disulfides which comprises subjecting reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by reacting said reactants in the presence of hydrogen bromide as a catalyst.

5. The method of synthesizing organic disulfides which comprises subjecting, at a temperature of from about 20° C. to about 225° C., reactants containing different organo-thiyl groups selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by reacting said reactants in the presence of a catalyst chosen from the group consisting of, chlorine, bromine, iodine, hydrogen chloride, hydrogen bromide, and hydrogen iodide.

6. The method of synthesizing an unsymmetrical organic disulfide which comprises effecting the redistribution of the organo-thiyl groups within a mixture of organic disulfides—the organo-thiyl groups of said reactants being in combination different from that of the reaction products—by reacting said mixture in the presence of a catalyst chosen from the group consisting of, chlorine, bromine, iodine, hydrogen chloride, hydrogen bromide, and hydrogen iodide.

7. The method of synthesizing an unsymmetrical organic disulfide, RSSR', which comprises effecting the redistribution of the organo-thiyl groups within a mixture of two symmetrical organic disulfides, RSSR, and R'SSR', wherein R and R' represent two different organic radicals, by reacting said mixture in the presence of a catalyst chosen from the group consisting of, chlorine, bromine, iodine, hydrogen chloride, hydrogen bromide, and hydrogen iodide.

8. The method of synthesizing an unsymmetrical organic disulfide which comprises subjecting a mixture of an organic disulfide and a mercaptan—the organo-thiyl groups of said reactants being in combination different from that of the reaction products—to a redistribution of their organo-thiyl groups by reacting said mixture in the presence of a catalyst chosen from the group consisting of, chlorine, bromine, iodine, hydrogen chloride, hydrogen bromide, and hydrogen iodide, and recovering the unsymmetrical organic disulfide and the mercaptan formed in the process.

9. The method of synthesizing an unsymmetrical organic disulfide which comprises subjecting a mixture of approximately molar equivalent quantities of a symmetrical organic disulfide, RSSR, and a mercaptan, R'SH, wherein R and R' represent two different organic radicals, to a redistribution of their organo-thiyl groups by reacting said mixture in the presence of a catalyst chosen from the group consisting of, chlorine, bromine, iodine, hydrogen chloride, hydrogen bromide, and hydrogen iodide, and recovering the unsymmetrical organic disulfide and the mercaptan formed in the process.

10. The method of synthesizing a symmetrical organic disulfide which comprises subjecting a mixture of approximately one mol of an organic disulfide and at least two mols of a mercaptan—the organo-thiyl groups of said reactants being in combination different from that of the reaction products—to a redistribution of their organo-thiyl groups by reacting said mixture in the presence of a catalyst chosen from the group consisting of, chlorine, bromine, iodine, hydrogen chloride, hydrogen bromide, and hydrogen iodide, and recovering the symmetrical organic disulfide and the mercaptan formed in the process.

11. The method of synthesizing a symmetrical organic disulfide, R'SSR', which comprises subjecting a mixture of approximately one mol of a symmetrical organic disulfide, RSSR, and at least two mols of a mercaptan, R'SH, wherein R and R' represent two different organic radicals, to a redistribution of their organo-thiyl groups by reacting said mixture in the presence of a catalyst chosen from the group consisting of, chlorine, bromine, iodine, hydrogen chloride, hydrogen bromide and hydrogen iodide, and recovering the symmetrical organic disulfide and the mercaptan formed in the process.

12. The method of synthesizing the symmetrical organic disulfides, RSSR, and R'SSR', which comprises subjecting an unsymmetrical organic disulfide, RSSR', wherein R and R' represent two different organic radicals, to a redistribution of its organo-thiyl groups by reacting said unsymmetrical organic disulfide in the presence of a catalyst chosen from the group consisting of. chlorine, bromine, iodine, hydrogen chloride, hydrogen bromide, and hydrogen iodide.

MORTON KLEIMAN.

REFERENCES CITED

The following references are of record in the file of this patent:

UNITED STATES PATENTS

| Number | Name | Date |
| --- | --- | --- |
| 2,001,715 | Fischer | May 21, 1935 |
| 2,174,248 | Mikeska | Sept. 26, 1939 |
| 2,230,542 | Meinert | Feb. 4, 1941 |
| 2,237,627 | Olin | Apr. 8, 1941 |
| 2,259,861 | Richardson | Oct. 21, 1941 |

OTHER REFERENCES

Otto et al., Berichte, vol. 19, 3132–5 (1886).